US006707510B2

(12) United States Patent
Mimura

(10) Patent No.: US 6,707,510 B2
(45) Date of Patent: Mar. 16, 2004

(54) DEFLECTION YOKE HAVING HORIZONTAL DEFLECTION COILS AND A BALANCE COIL AND METHOD FOR CONSTRUCTING THEREOF

(75) Inventor: Yoshiaki Mimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 313 days.

(21) Appl. No.: 09/781,454

(22) Filed: Feb. 13, 2001

(65) Prior Publication Data

US 2002/0030766 A1 Mar. 14, 2002

(30) Foreign Application Priority Data

Sep. 11, 2000 (JP) ....................................... 2000-274413

(51) Int. Cl.[7] .......................... H04N 5/655; G09G 1/28; H01J 29/70

(52) U.S. Cl. .................. 348/829; 348/828; 315/368.26; 315/368.25; 315/368.28; 313/440

(58) Field of Search ................................ 348/829, 828, 348/825, 831; 313/440; 315/368.26, 368.25, 368.28, 368.27, 370, 399

(56) References Cited

U.S. PATENT DOCUMENTS 5,059,858 A * 10/1991 Shimoma et al. ........... 313/440
6,016,093 A * 1/2000 Grubben et al. ............ 335/210
6,218,773 B1 * 4/2001 Misono et al. .............. 313/440
6,404,133 B1 * 6/2002 Uchida et al. ................ 315/85

FOREIGN PATENT DOCUMENTS

JP 6153000 5/1994
JP 8250042 9/1996

* cited by examiner

*Primary Examiner*—Tuyet T. Vo
(74) *Attorney, Agent, or Firm*—Birch, Stewart, Kolasch & Birch, LLP

(57) ABSTRACT

A deflection yoke has first and second horizontal deflection coils formed of a solid wire. A first bobbin and a second bobbin are formed in one-piece construction with each other. The first coil-end lead of the first horizontal deflection coil and the second coil-end lead of the second horizontal deflection coil are wound around the second bobbin to form a balance coil such that the balance coil is formed continuous with horizontal deflection coils. After the first and second horizontal deflection coils and the balance coil have been wound around the respective bobbins, the second bobbin may be separated from the first bobbin and then the second bobbin may be mounted to a desired part of the first bobbin.

8 Claims, 7 Drawing Sheets

CONVENTIONAL ART

CONVENTIONAL ART

DEFLECTION YOKE HAVING HORIZONTAL DEFLECTION COILS AND A BALANCE COIL AND METHOD FOR CONSTRUCTING THEREOF

BACKGROUND OF THE INVENTION

1. Field of the Invention

The present invention relates to a deflection yoke assembled to a cathode ray tube (CRT) for use in, for example, a television receiver and a monitor display, and more particularly to the mounting of a balance coil for a horizontal deflection coil.

2. Description of the Related Art

It is well known that a deflection yoke is assembled to a CRT for a television receiver and a monitor display and operates to deflect electronic beams both in a horizontal direction and in a vertical direction.

FIG. 9 is a side view of a conventional deflection yoke, showing only a pertinent portion required for generating a deflection magnetic field. A horizontal yoke coil is a coil that causes R, G, and B electron beams of the CRT to deflect in a horizontal direction. The horizontal yoke coil includes two vertically disposed coils: an upper horizontal yoke coil 1*a* and a lower horizontal yoke coil 1*b* supported on a bobbin 3. The bobbin 3 has grooves, depicted in dotted lines, in which the horizontal yoke coils 1*a* and 1*b* are wound. The bobbin 3 serves as a spacer to insulate the horizontal yoke coil from other coils and also supports the entire deflection yoke thereon. An adjustment core 6 is used to adjust the balance between the upper and lower coils 1*a* and 1*b*. Reference numeral 7 denotes a vertical deflection coil and numeral 8 denotes a core that controls the deflection magnetic field. A printed circuit board 9 receives leads 10 that are led out of the vertical coil 7, the end portions 11*a* and 11*b* of the upper and lower coils 1*a* and 1*b*. The balance coil 13 for adjusting the horizontal deflection magnetic field is wound on the bobbin 12.

As shown in FIG. 9, the deflection yoke includes a pair of upper and lower coils 1*a* and 1*b*, the vertical coil 7, the core 8, the bobbin 12, a balance coil unit that includes the coil 13 and adjustment core 6, the leads 10, 11*a*, and 11*b* of the various coils, and the printed circuit board 9.

FIG. 10 illustrates the structure of the balance coil unit. The bobbin 12 is formed of a resin material and has two coil sections aligned in line with each other. The balance coil 13 is wound around the coil sections. The adjustment core 6 is inserted into the bobbin 12 and moved back and forth to change the position of the adjustment core 6, thereby adjusting the inductance value of the balance coil 13. The bobbin 12 is mounted on the printed circuit board 9 with its legs inserted into the printed circuit board 9 in FIG. 9. The balance coil unit has lead wires that are electrically connected to the end portions 11*a* and 11*b* of the horizontal deflection coil 1*a* and 1*b*, respectively. The balance coil unit has further lead wires that are electrically connected to a terminal 2*a*. The printed circuit board 9 receives these lead wires of the balance coil unit.

FIG. 11 illustrates electrical connection for generating the horizontal deflection magnetic field.

Referring to FIG. 11, the upper and lower coils 1*a* and 1*b* have one ends connected to the terminal 2*b* and the other ends connected to the balance coil 13. Two wires are led out from a substantially mid point of the balance coil 13 and connected to the terminal 2*a*. A horizontal drive circuit, not shown, provides a current, which generates the horizontal deflection magnetic field, through the terminals 2*a* and 2*b* to the upper and lower coils 1*a* and 1*b*.

As shown in FIG. 9, the balance coil unit is disposed on a side of the printed circuit board 9 opposite to a side on which wiring patterns are formed. The lead wires of the balance coil unit in FIG. 10 are connected to the wiring patterns through the terminal boards and grommets mounted on the printed circuit board 9. External forces are often exerted to the horizontal coil and balance coil, and a large current flows through these coils. Thus, in order to comply with safe standards, the grommets are required to electrically connect to the wiring patterns formed on the circuit board 9.

With the conventional deflection yoke of the aforementioned construction, the balance coil 13 and the wiring patterns are disposed on the same side of the circuit board 9 as shown in FIG. 10. This configuration is disadvantageous in reflow soldering. Therefore, an expensive double-sided printed circuit board with through-holes or grommets has to be employed.

Further, many terminals require hand-soldering. The heat capacity of an soldering iron is only about 2000 Kcal and takes about 5–6 seconds to solder one terminal. This is very inefficient.

When a reflow soldering apparatus is used, the resin-molded coil bobbin can melt since the coil bobbin 12 comes into contact with the melted solder with the result that the resin molded coil bobbin melts. In order to prevent this problem, the balance coil unit is first dismounted from the printed circuit board 9, and then a preparatory work is done to prevent the parts-receiving holes in the printed circuit board 9 from being clogged with solder. Finally, hand soldering is required for soldering on the other side of the printed circuit board 9. Alternatively, the lead wires may be soldered simultaneously. This simultaneous soldering operation, of course, reduces the time required for soldering but requires additional operations for separating the balance coil unit from the printed circuit board 9 and for replacing the balance coil unit to the printed circuit board 9.

Japanese Patent Preliminary Publication (KOKAI) No. 08-250042 discloses one such deflection yoke having the aforementioned drawbacks. With the disclosed deflection yoke, a horizontal deflection coil and a balance coil are mounted on the same side of the printed circuit board 9. Lead wires from the respective coils are led out from the same side of the printed circuit board 9 and soldered by using a reflow soldering apparatus. However, a preparatory work was required for the lead wires of the horizontal coils and balance coil before they are subjected to reflow soldering.

SUMMARY OF THE INVENTION

The present invention was made in view of the aforementioned drawbacks of the conventional art.

An object of the invention is to simplify the wiring operation for a horizontal deflection coil and a balance coil, and improve reliability of the deflection yoke.

A deflection yoke has a pair of vertical deflection coils as well as first and second horizontal deflection coils. The first and second horizontal deflection coils are aligned vertically and mounted to a cathode ray tube. The first and second horizontal deflection coils surrounds a cylindrical core formed to extend along the neck of the cathode ray tube. A balance coil is connected in series with the first and second horizontal deflection coils and has an adjustable inductance. The deflection yoke includes a first bobbin as first supporting means and a second bobbin as second supporting means. The first bobbin supports the first and second horizontal deflection coils each of which has a first coil-end lead and a second coil-end lead. The second bobbin supports the balance coil thereon. The first bobbin and second bobbin are formed in one-piece construction with each other. The first coil-end lead of the first horizontal deflection coil (1*a*) and the second coil-end lead of the second horizontal deflection coil are wound around the second bobbin to form the balance coil such that the balance coil is formed continuous with horizontal deflection coils.

The first and second horizontal deflection coils may be formed of a solid wire.

The first and second horizontal deflection coils may be formed of a plurality of wires. For example, the first and second horizontal deflection coils are formed of litz wire.

After the first and second horizontal deflection coils and the balance coil have been wound around the respective bobbins, the second bobbin is separated from the first bobbin and than the second bobbin is mounted to a desired part of the first bobbin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

The present invention will be described in detail by way of example.

First Embodiment

A deflection yoke according to a first embodiment is characterized in that means for supporting a horizontal deflection coil is in one-piece construction with a bobbin for a balance coil.

Figure 1A:
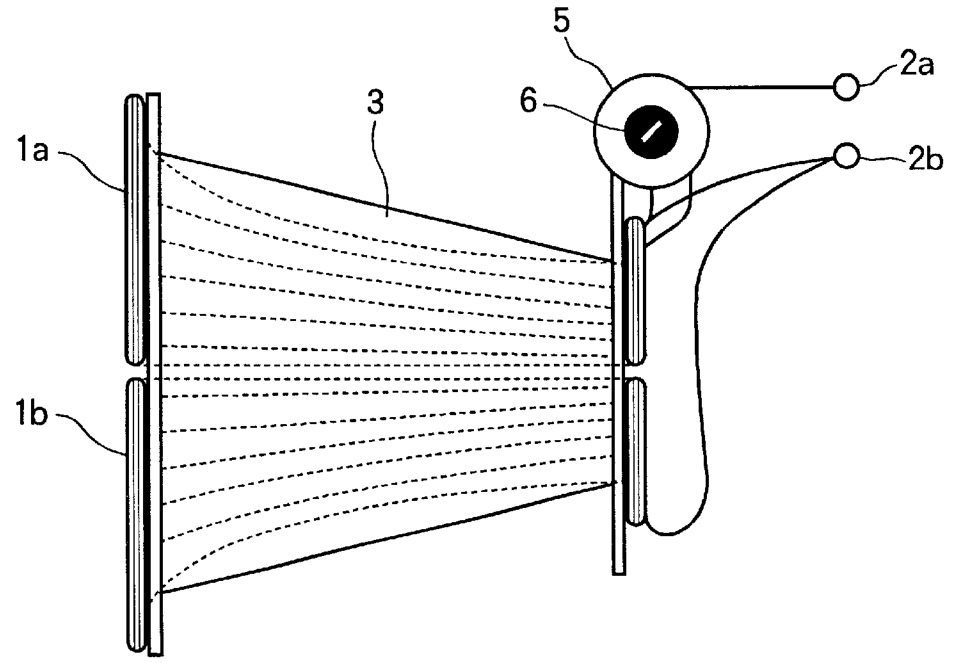
FIGS. 1A and 1B illustrate a horizontal deflection coil and a balance coil for a deflection yoke according to the first embodiment, FIG. 1A being a side view and FIG. 1B being a rear view.
Figure 1B:
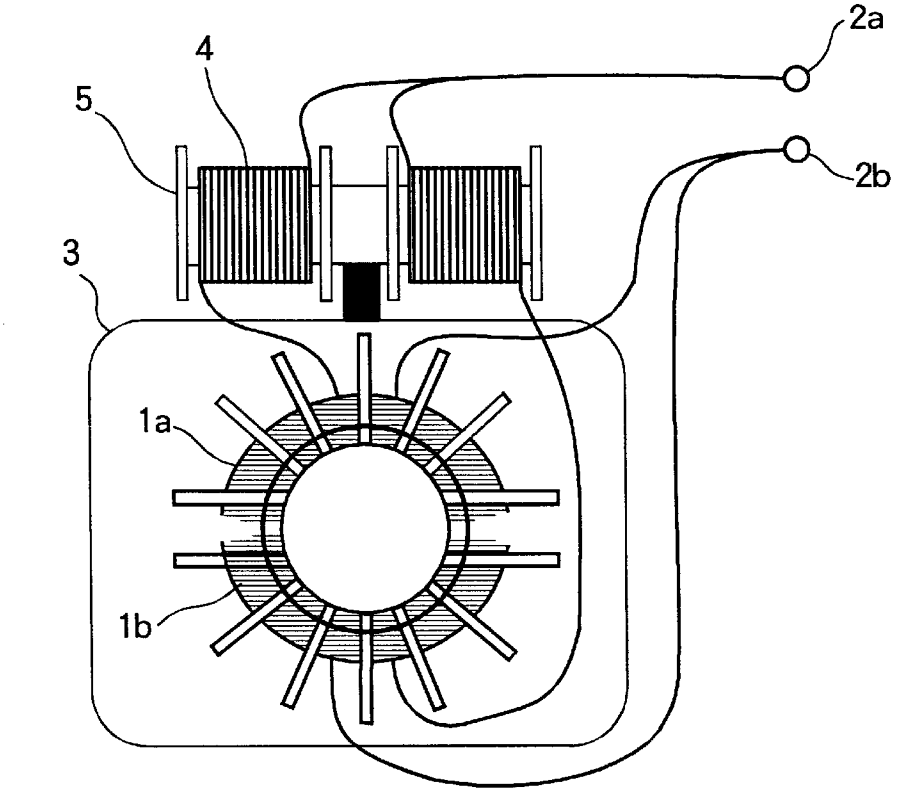

FIGS. 1A and 1B illustrate a horizontal deflection coil and a balance coil for a deflection yoke according to the first embodiment. FIG. 1A is a side view and FIG. 1B is a rear view where the CRT is seen from the neck side.

Figure 2:
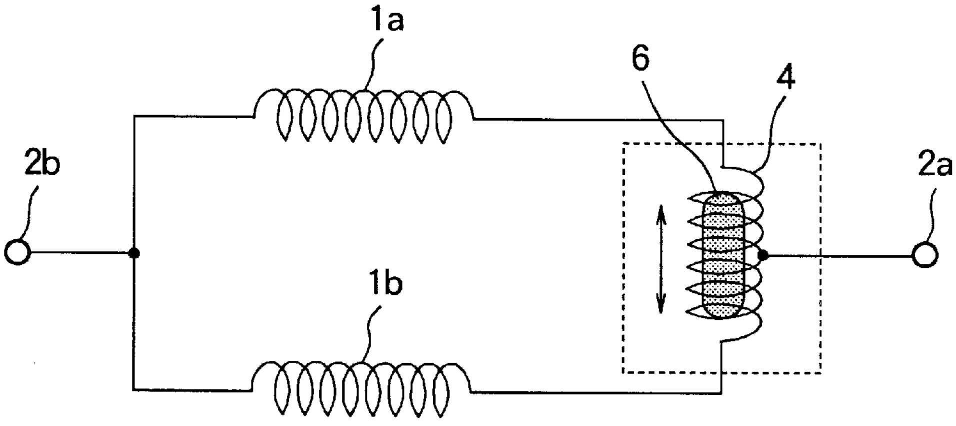
FIG. 2 illustrates electrical connection between the horizontal deflection coil and the balance coil.

FIG. 2 illustrates electrical connection between the horizontal deflection coil and the balance coil.

Figure 3:
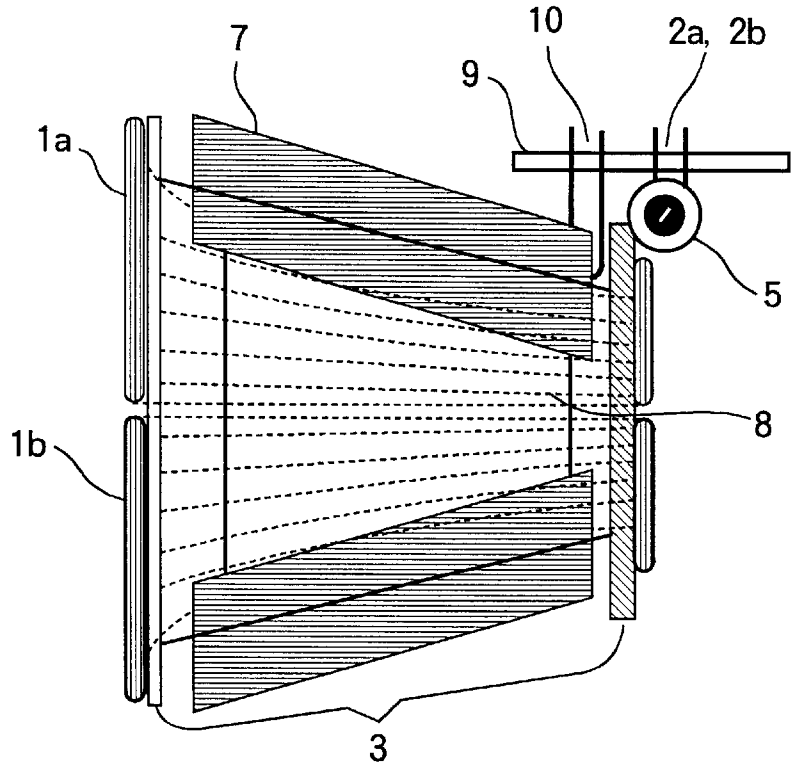
FIG. 3 illustrates the overall view of the deflection yoke according to the invention.

FIG. 3 illustrates the overall view of the deflection yoke according to the invention.

Elements similar to those of the conventional art have been given the same reference numerals and the description thereof is omitted.

Referring to FIGS. 1A, 1B, 2, and 3, a bobbin 3 for the horizontal deflection coil and a bobbin 5 for the balance coil are in one piece construction with each other. The bobbin 3 has grooves therein in which the upper and lower coils 1*a* and 1*b* of the horizontal deflection coil are wound. The bobbin 3 supports the entire deflection yoke and serves as a spacer that insulates the upper and lower coils from other coils. The upper and lower coils 1*a* and 1*b* are required to produce an accurate deflection magnetic field and therefore are of complex winding construction. The balance coil is wound around the bobbin 5 and is in the form of a simple solenoid. A core can be inserted into the bobbin 5 to adjust the inductance of the balance coil, thereby balancing the inductance values of the upper and lower coils 1*a* and 1*b*. The balance coil includes two halves each of which has turns slightly more than ten turns, and is hand-wound. This is because the balance coil does not have to be wound with high accuracy. The position of the bobbin 5 relative to the bobbin 3 is selected such that the bobbin 5 does not interfere with the hand-winding operation of the balance coil. The extended lead of the beginning of the upper coil 1*a* and the extended lead of the ending of the lower coil 1*b* are wound around the bobbin 5 to form the balance coil 4. In other words, the balance coil 4 and the upper and lower coils 1*a* and 1*b* are formed of a single, continuous wire or solid wire. Even though the bobbin 3 and bobbin 5 are in one piece construction, there is no inconvenience when the horizontal deflection coil is wound using a winding machine but there is a little inconvenience when the balance coil is wound. However, the overall assembly operation is simplified greatly as compared to a case where the horizontal deflection coil and balance coil are individually wound and then they are connected to each other through the wiring patterns formed on a printed circuit board 9.

The construction of the deflection yoke according to the first embodiment will be described with reference to the drawings. The deflection yoke in FIG. 3 is used for primarily television receivers and the horizontal deflection frequency is about 15 kHz. However, in order to meet a power-saving requirement, the deflection yoke is formed of a solid wire and has a large number of turns (i.e., large inductance value), thereby generating a large deflection magnetic field from a small current. The actual inductance values of the upper and lower coils 1*a* and 1*b* are on the order of 0.1 mH for a display monitor, while about 2.4 mH for a television receiver, i.e., more than 20 times larger inductance.

The actual inductance value of the vertical deflection coil 7 is 4.8 mH for a display monitor and 17.6 mH for a television receiver, i.e., more than three times larger inductance. The vertical deflection coil 7 requires a large inductance value compared to the upper and lower coils 1*a* and 1*b* and therefore is usually wound along the outer surface of the core 8. The vertical deflection coil 7 is supported by the bobbin 3.

FIG. 2 is a schematic diagram of the upper and lower coils 1*a* and 1*b* and the balance coil 4 that are wound in the aforementioned manner. The balance coil 4 includes the adjustment core 6 inserted into the balance coil 4. The core 6 serves to correct non-uniformity of the horizontal deflection magnetic field caused by the slight unbalance between the upper and lower coils 1*a* and 1*b*, and non-uniformity of convergence resulting from the construction in which the upper and lower coils 1*a* and 1*b* are mounted on the CRT. The adjustment core 6 is adjusted from outside for optimum convergence.

In order to achieve the connection of FIG. 2, the extended leads of the upper and lower coils 1*a* and 1*b* are connected as shown in FIG. 1B. That is, one extended leads of the upper and lower coils 1*a* and 1*b* are connected together to the terminal 2*b*, while the other extended leads of the upper and lower coils 1*a* and 1*b* are wound around the bobbin 5 to form the balance coil 4. A mid point of the balance coil 4 is connected to the terminal 2*a*. At the subsequent assembly stage, the terminals 2*a* and 2*b* are connected to a horizontal drive circuit, not shown, which supplies a horizontal deflection current into the upper and lower coils 1*a* and 1*b*. Usually, the individual circuits in a television receiver are connected through connectors, not shown, that are mounted on the printed circuit board 9. The ends of the upper and lower coils 1*a* and 1*b* are connected to the printed circuit board 9.

The deflection yoke includes the vertical deflection coil 7 as well as the aforementioned upper and lower coils 1*a* and 1*b*. Connectors, not shown, for electrically connecting the lead wires of the vertical deflection coil 7 to the vertical drive circuit can be disposed on the printed circuit board 9. Various correcting circuits for vertical deflection and horizontal deflection may be mounted on the printed circuit board 9. If the various correcting circuits are not mounted on the printed circuit board 9, the leads of the respective coils can be directly connected to the drive circuit. As described above, the means for supporting the horizontal deflection coil according to the first embodiment is formed in one piece construction with the bobbin for the balance coil, and supports the entire deflection yoke.

Second Embodiment

A deflection yoke according to a second embodiment is characterized in that the upper and lower coils 1*a* and 1*b* are formed of litz wire.

Figure 4:
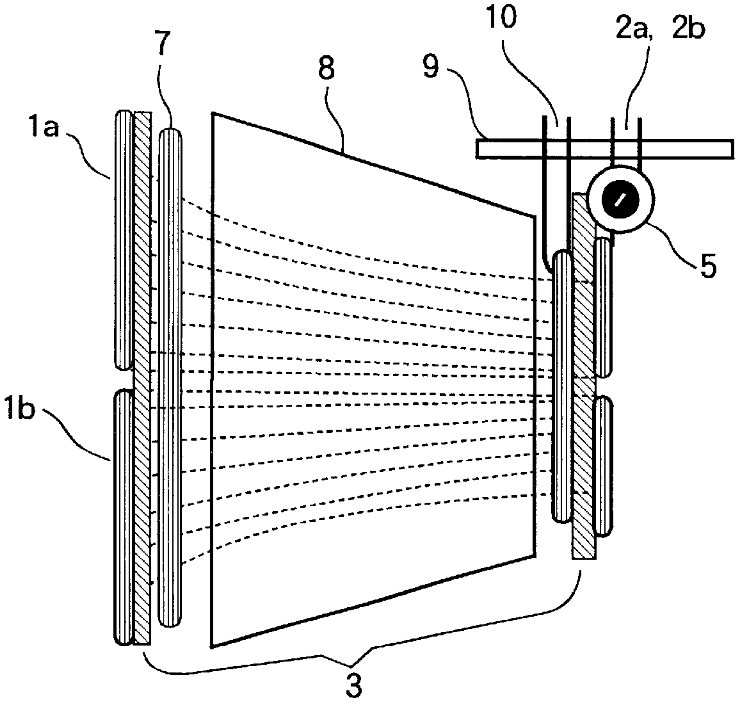
FIG. 4 illustrates the structure of the deflection yoke according to the second embodiment.

FIG. 4 illustrates the structure of the deflection yoke according to the second embodiment.

The same elements as in FIG. 3 have been given the same reference numerals and the description thereof is omitted. The configuration of the upper and lower coils 1*a* and 1*b* and balance coil and the connection between the upper and lower coils 1*a* and 1*b* and the balance coil are the same as those in FIG. 1A and 1B and FIG. 2.

The construction of the deflection yoke according to the second embodiment will be described with reference to FIG. 4.

The deflection yoke is used primarily in a display monitor that requires a highly accurate deflection magnetic field. The frequency of the horizontal deflection magnetic field is as high as about 100 kHz and therefore the inductance values of the upper and lower coils 1*a* and 1*b* are maintained as low as 0.1 mH. Thus, the upper and lower coils 1*a* and 1*b* should have good high frequency characteristics. For this reason, the upper and lower coils 1*a* and 1*b* are formed of litz wire (a plurality of wires) and are wound with a winding machine on the bobbin 3 of the horizontal deflection yoke having a winding guide.

The bobbin 3 is continuous with the bobbin 5 for the balance coil 4 at a location shown in FIG. 4. The extended lead at the beginning of the upper coil 1*a* and the extended lead at the ending of the lower coils 1*b* and are wound around the bobbin 5 to form the balance coil 4. In other words, the upper and lower coils 1*a* and 1*b* and the balance coil 4 are formed of a single, continuous litz wire without cutting any part thereof.

The thus wound upper and lower coils 1*a* and 1*b* and the balance coil 4 are connected as shown in FIG. 2. Then, the mid point of the balance coil 4 is led out to the terminals 2*a* and the junction of the upper and lower coils 1*a* and 1*b* is led to the terminal 2*b*, thereby being electrically connected to the printed circuit board 9.

The deflection yoke according to the second embodiment uses litz wire for the upper and lower coil 1*a* and 1*b*. The means that serves as a winding groove to support the windings also supports the bobbin for the balance coil.

Third Embodiment

Figure 5:
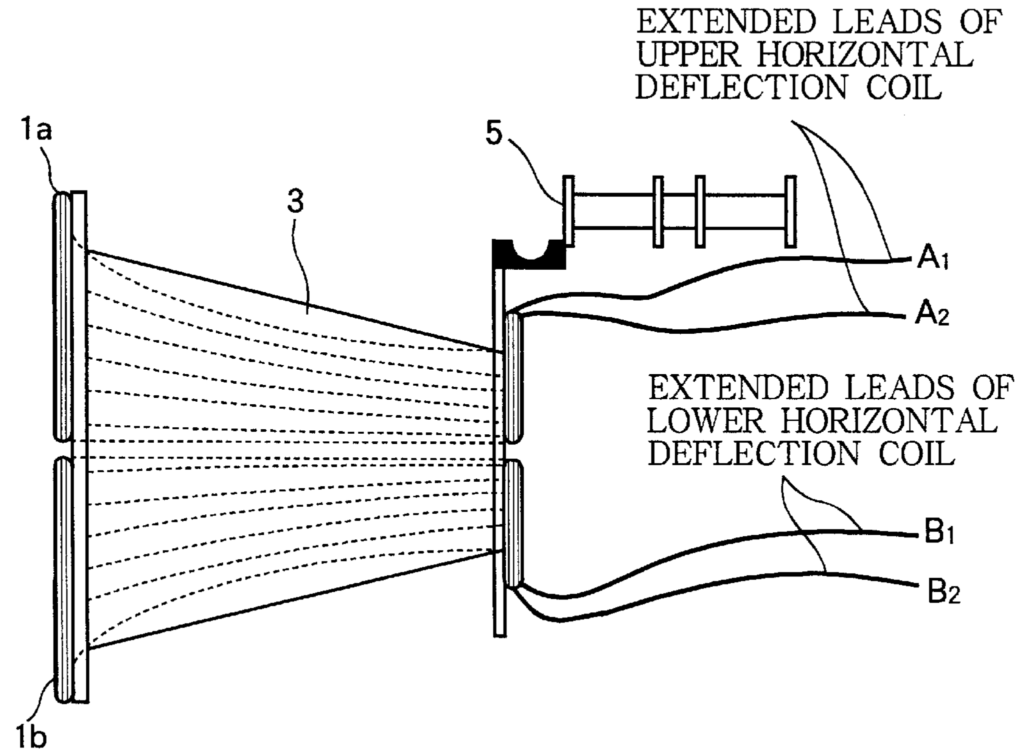
FIG. 5 illustrates the upper and lower coils wound up using a specially designed winding machine.

FIG. 5 illustrates the upper and lower coils 1*a* and 1*b* that have been wound using a specially designed winding machine. The extended leads at the beginning of the upper coil 1*a* and the extended leads of the ending of the lower coils 1*b* are wound around the bobbin 5 to form the balance coil 4, thereby implementing the upper and lower coils 1*a* and 1*b* and the balance coil 4 formed of a single, continuous litz wire without cutting any part thereof. The bobbin 3 and bobbin 5 are in one piece construction with each other. The winding operation of the upper and lower coils 1*a* and 1*b* is complex. Thus, the bobbin 5 is positioned relative to the bobbin 3 such that the bobbin 5 does not interfere with the hand-winding operation of the balance coil.

Figure 6:
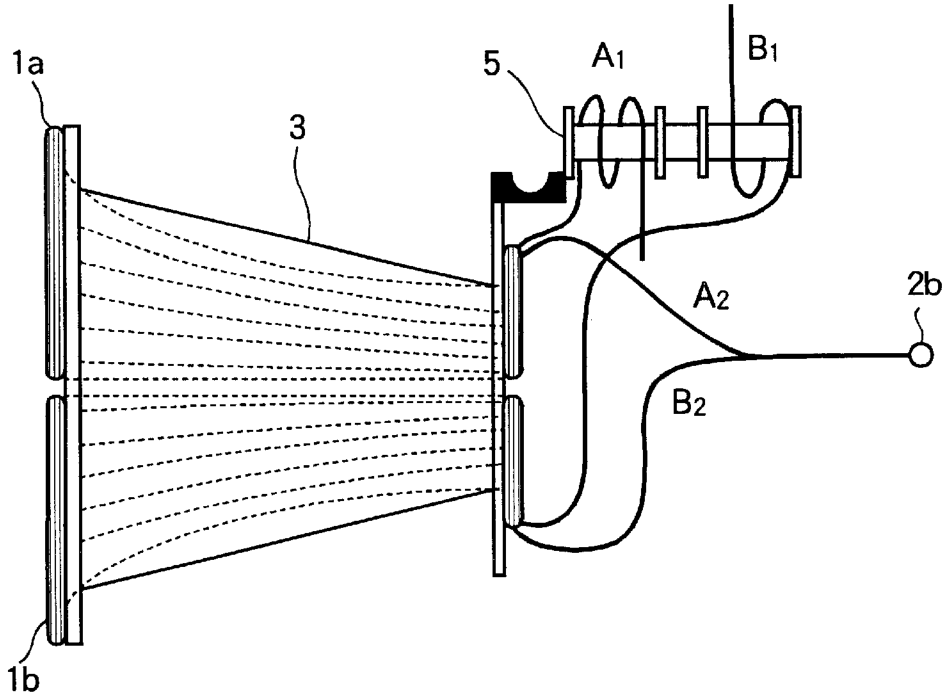
FIG. 6 illustrates the extended lead of the upper and lower coils are wound around the bobbin.

FIG. 6 illustrates the extended leads of the upper and lower coils 1*a* and 1*b* are wound around the bobbin 5. Extended leads A2 and B2 at one ends of the upper and lower coils 1*a* and 1*b* are connected to the terminal 2*b*, and the extended leads A1 and B1 at the other ends are wound directly around the bobbin 5.

Figure 7:
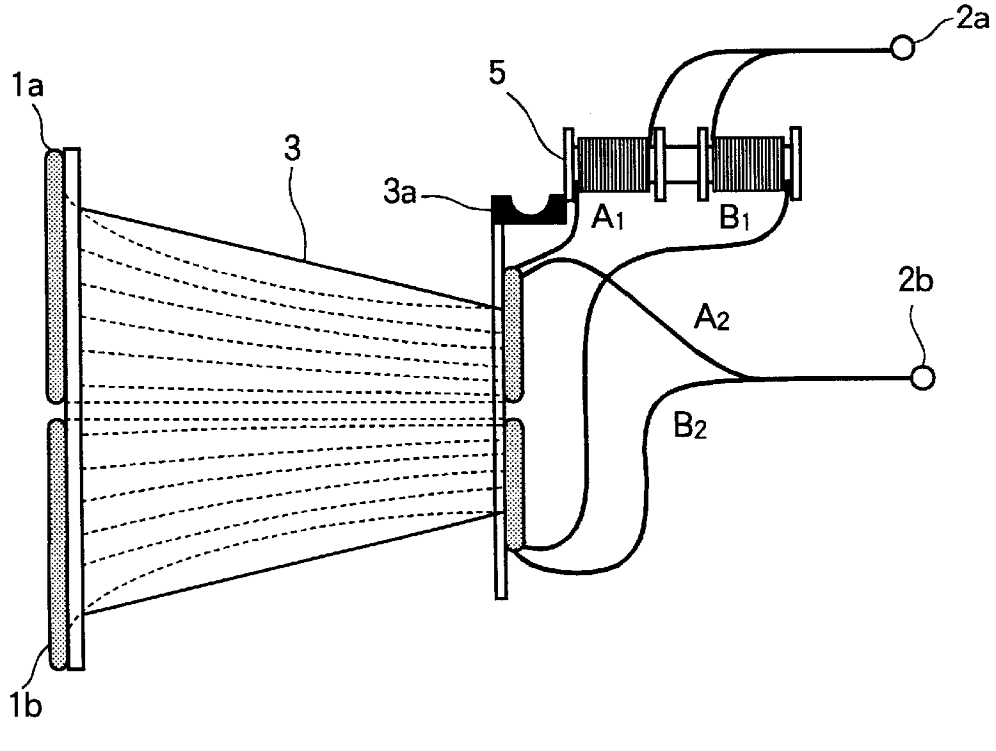
FIG. 7 illustrates the extended leads of the upper and lower coils wound around the bobbin.

FIG. 7 illustrates the extended leads A1 and B1 of the upper and lower coils 1*a* and 1*b*, respectively, wound around the bobbin 5.

Figure 8A:
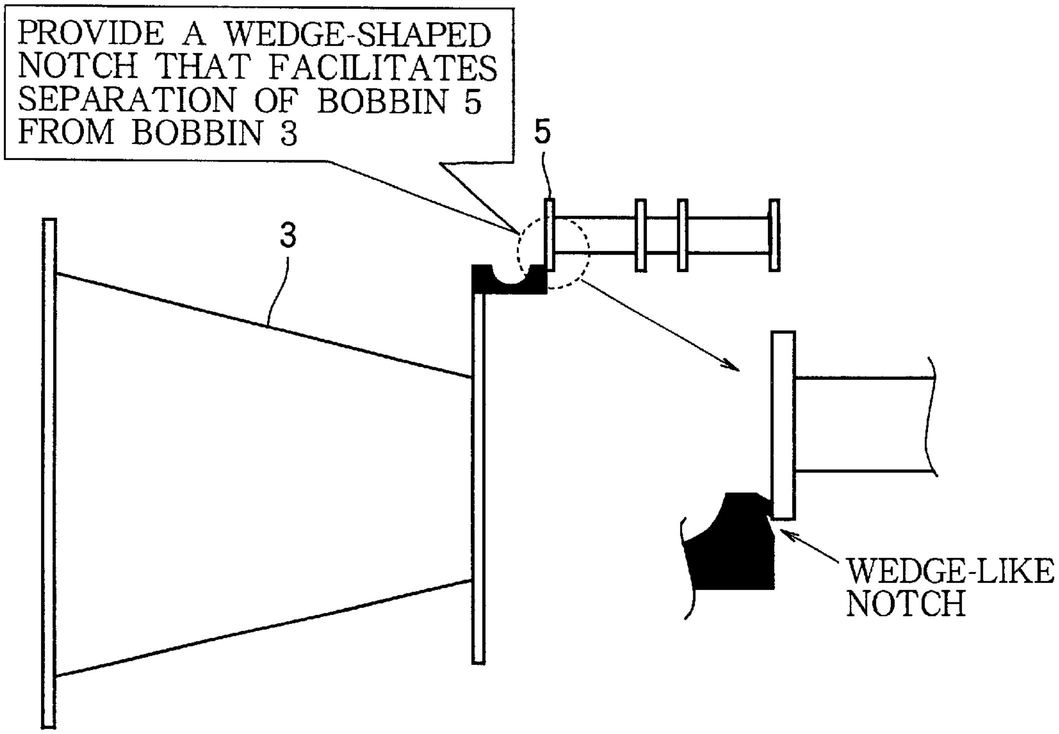
FIG. 8A is a side view illustrating the bobbin and bobbin in one piece construction with each other.

FIG. 8A is a side view illustrating the bobbin 5 and bobbin 3 in one-piece construction with each other.

Figure 8B:
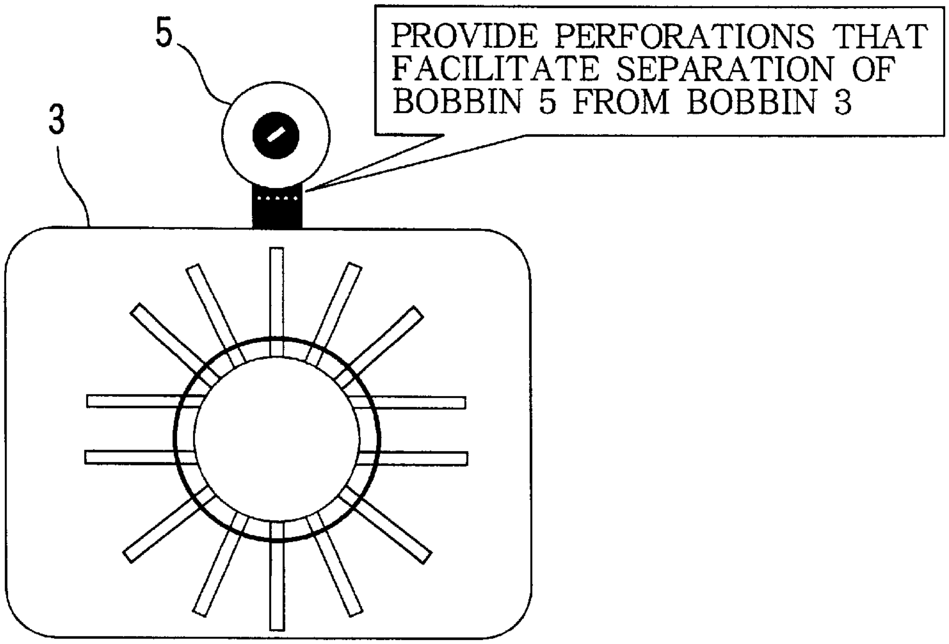
FIG. 8B is a rear view of the deflection yoke of FIG. 8A.
Figure 9:
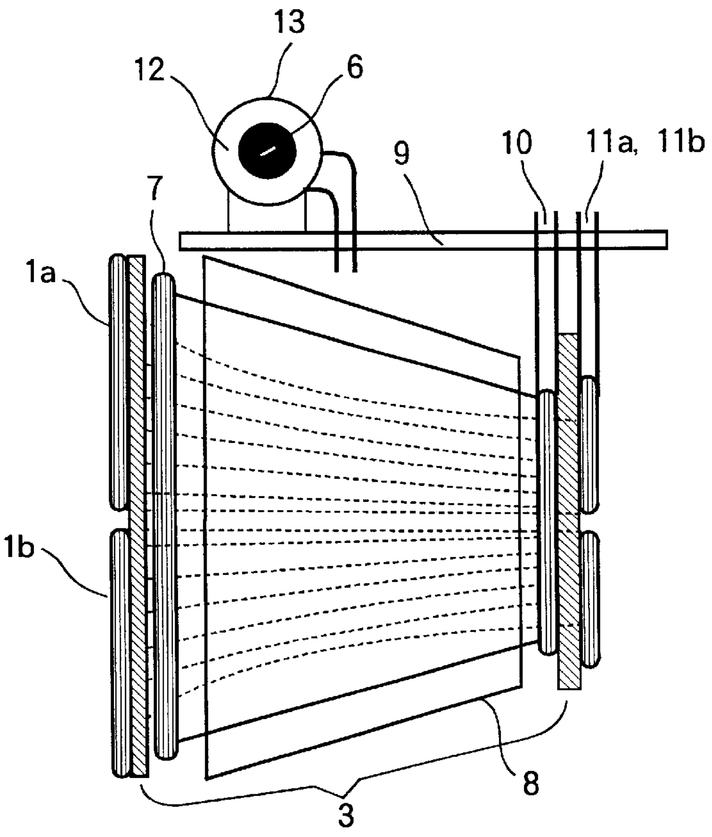
FIG. 9 is a side view of a conventional deflection yoke, showing only a pertinent portion required for generating a deflection magnetic field.
Figure 10:
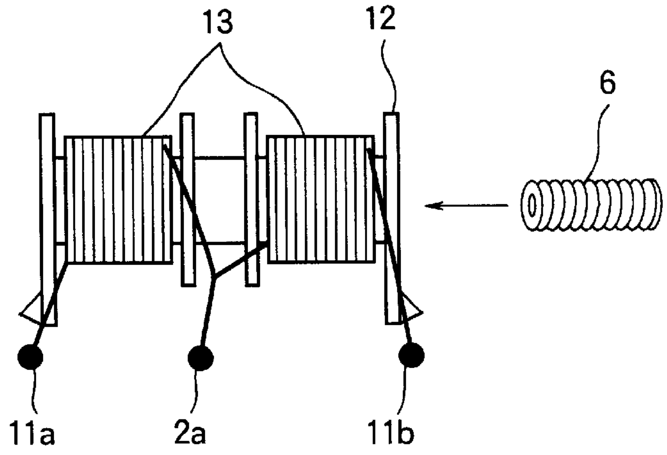
CONVENTIONAL ART FIG. 10
FIG. 10 illustrates the structure of the balance coil unit.
Figure 11:
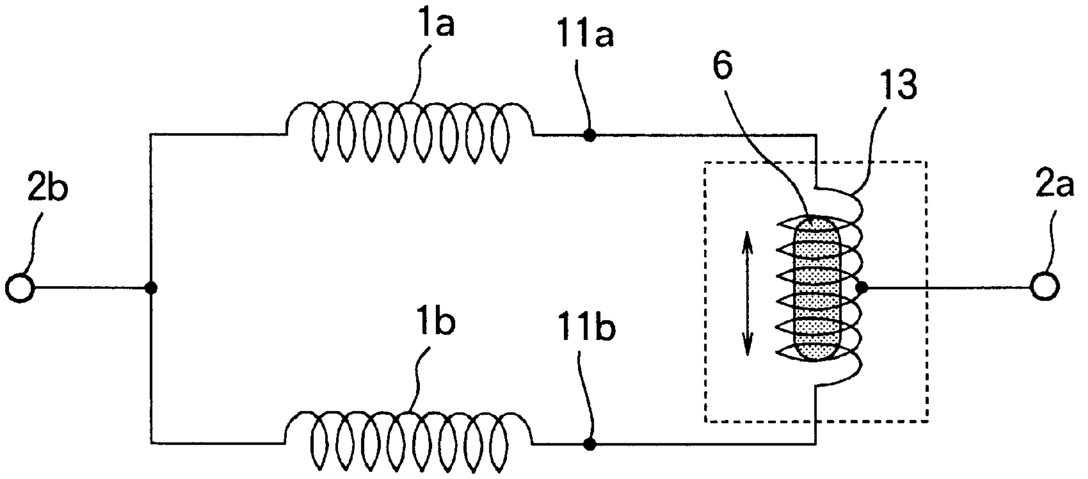
FIG. 11 illustrates electrical connection for generating the horizontal deflection magnetic field.

FIG. 8B is a rear view of the deflection yoke of FIG. 8A. In a third embodiment, the bobbin 5 around which the balance coil 4 is wound is cut off the bobbin 3. There is provided a wedge like notch as shown in FIG. 8A or perforations as shown in FIG. 8B formed along an area at which the bobbin 5 is to be cut off the bobbin 3. The notch or perforations allow the bobbin 5 to be separated from the bobbin 3 without difficulty. The bobbin 5 is separated from the bobbin 3 and then is mounted to a convenient part of the bobbin 3 where the deflection magnetic field can be adjusted without difficulty at a later manufacturing stage and the deflection is not adversely affected by the coil wound on the bobbin 5. Thereafter, the lead wires of the respective coils are soldered.

In the third embodiment, the bobbin 5 on which the balance coil has been wound is separated from the bobbin 3 and then the bobbin 5 is mounted to a means that supports the horizontal deflection coil. This allows the balance coil 4 to be mounted at an optimum location.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A deflection yoke having a first horizontal deflection coil and a second horizontal deflection coil aligned vertically and mounted to a cathode ray tube; and a balance coil connected in series with the first and second horizontal deflection coils; the deflection yoke comprising:

first supporting means, supporting the first horizontal deflection coil and the second horizontal deflection coil, each of which has a first lead and a second lead;

second supporting means, supporting the balance coil;

wherein the first supporting means and the second supporting means are formed in one piece construction with each other, and the first lead of the first horizontal deflection coil and the second lead of the second horizontal deflection coil are wound around the second supporting means to form the balance coil;

wherein the first and second horizontal deflection coils are formed of a solid wire, and wherein after the first and second horizontal deflection coils and the balance coil have been wound around the respective supporting means, the second supporting means is separated from the first supporting means and then the second supporting means is mounted to a desired part of the first supporting means.

2. A deflection yoke, having a first horizontal deflection coil and a second horizontal deflection coil aligned vertically and mounted to a cathode ray tube; and a balance coil connected in series with the first and second horizontal deflection coils; the deflection yoke comprising:

first supporting means, supporting the first horizontal deflection coil and the second horizontal deflection coil, each of which has a first lead and a second lead;

second supporting means, supporting the balance coil;

wherein the first supporting means and the second supporting means are formed in one piece construction with each other, and the first lead of the first horizontal deflection coil and the second lead of the second horizontal deflection coil are wound around the second supporting means to form the balance coil;

wherein the first and second horizontal deflection coils are formed of a plurality of wires, and wherein after the first and second horizontal deflection coils and the balance coil have been wound around the respective supporting means, the second supporting means is separated from the first supporting means and then the second supporting means is mounted to a desired part of the first supporting means.

3. A deflection yoke having a first horizontal deflection coil and a second horizontal deflection coil aligned vertically and mounted to a cathode ray tube; and a balance coil connected in series with the first and second horizontal deflection coils; the deflection yoke comprising:

first supporting means, supporting the first horizontal deflection coil and the second horizontal deflection coil, each of which has a first lead and a second lead;

second supporting means, supporting the balance coil;

wherein the first supporting means and the second supporting means are formed in one piece construction with each other, and the first lead of the first horizontal deflection coil and the second lead of the second horizontal deflection coil are wound around the second supporting means to form the balance coil in conjunction with the first horizontal deflection coil and the second horizontal deflection coil being wound around the first supporting means.

4. The deflection yoke according to claim 3, wherein the first and second horizontal deflection coils are formed of a solid wire.

5. The deflection yoke according to claim 3, wherein the first and second horizontal deflection coils are formed of a plurality of wires.

6. The deflection yoke according to claim 5, wherein the first and second horizontal deflection coils are formed of litz wire.

7. A method for constructing a deflection yoke having a first horizontal deflection coil, a second horizontal deflection coil and a balance coil connected in series, the method comprising the steps of:

forming a first bobbin and a second bobbin in one piece, said first bobbin supporting said first horizontal deflection coil and said second horizontal deflection coil, and said second bobbin supporting said balance coil; and winding a continuous wire around said first bobbin and said second bobbin to form said first horizontal deflection coil, said second horizontal deflection coil, and said balance coil.

8. The method according to claim 7, further comprising the step of mounting said second bobbin to said first bobbin by separating the second bobbin from the first bobbin.

* * * * *